US009256659B1

(12) United States Patent
Willett et al.

(10) Patent No.: US 9,256,659 B1
(45) Date of Patent: Feb. 9, 2016

(54) SYSTEMS AND METHODS FOR GENERATING DATABASE IDENTIFIERS BASED ON DATABASE CHARACTERISTICS

(75) Inventors: Dallas L. Willett, Seattle, WA (US); Ramnath R. Iyer, Seattle, WA (US); Chelsea C. Krueger, Seattle, WA (US); Michael J. Russo, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 737 days.

(21) Appl. No.: 13/569,935

(22) Filed: Aug. 8, 2012

(51) Int. Cl.
*G06F 17/30* (2006.01)

(52) U.S. Cl.
CPC .... *G06F 17/30575* (2013.01); *G06F 17/30286* (2013.01)

(58) Field of Classification Search
None
See application file for complete search history.

(56) References Cited

U.S. PATENT DOCUMENTS

| | | | |
|---|---|---|---|
| 6,026,398 A * | 2/2000 | Brown et al. | 707/745 |
| 6,363,389 B1 * | 3/2002 | Lyle et al. | 707/695 |
| 6,714,948 B1 * | 3/2004 | Richards | |
| 6,859,808 B1 * | 2/2005 | Chong et al. | 707/741 |
| 7,685,185 B2 | 3/2010 | Ramasubramanian et al. | |
| 8,365,185 B2 | 1/2013 | Bobak et al. | |
| 8,429,162 B1 * | 4/2013 | Wang et al. | 707/737 |
| 8,700,674 B2 * | 4/2014 | Bear et al. | 707/802 |
| 2005/0119875 A1 * | 6/2005 | Shaefer et al. | 704/7 |
| 2008/0016085 A1 * | 1/2008 | Goff | 707/10 |
| 2008/0052322 A1 * | 2/2008 | Gusciora | 707/200 |
| 2009/0150973 A1 * | 6/2009 | Kim et al. | 726/1 |
| 2011/0320604 A1 * | 12/2011 | Kulkarni et al. | 709/226 |
| 2012/0259894 A1 * | 10/2012 | Varley et al. | 707/795 |
| 2013/0036149 A1 * | 2/2013 | Kosuru et al. | 709/201 |

* cited by examiner

*Primary Examiner* — Robert Beausoliel, Jr.
*Assistant Examiner* — Susan F Rayyan
(74) *Attorney, Agent, or Firm* — Sutherland Asbill & Brennan LLP (57) ABSTRACT

Described herein are systems and methods for generating integrated identifiers that may be combined with database sequence values to create a high probability of uniqueness that minimizes assigning duplicate identifiers to one or more databases. The integrated identifier may be based in part on several identifiers associated with a database. This may include a numeric identifier assigned to the database, a name assigned to the database, or any other database property that may be relatively unique. In one embodiment, the integrated identifier may be associated with a sequence value for a database. While the sequence value may be unique within the database, the integrated identifier may be unique to other database identifiers. When an existing database is cloned, a new integrated identifier may be generated from the cloned database. New records stored in the new database may use the new integrated identifier, while the cloned records will remain unedited.

21 Claims, 7 Drawing Sheets

SYSTEMS AND METHODS FOR GENERATING DATABASE IDENTIFIERS BASED ON DATABASE CHARACTERISTICS

BACKGROUND

The online industry has increased at a rapid pace and may continue to expand into the future with new products, services, and/or capabilities. Databases that store information related to the products, services and/or capabilities are ever increasing to meet the increase in demand. As a database increases in size, the efficiency in storing and accessing data decreases. One way to improve efficiency is to increase the number of databases to distribute database queries among a group of databases. Accordingly, techniques or methods that increase the uniqueness of the sequence values may be desirable.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for generating unique identifiers for database records based, at least in part, on the database name and a database identifier that stores the records.

Database management has increased in size and scope to account for the increased amount of online activity as the online realm reaches more users and offers more goods and services. As the amount of data increases or the rate of data increases, the number of databases may also increase. In some cases, databases may be cloned or copied to assist in generating more databases to make database information more easily accessible. For example, as the size of the database increases, the ability to access information decreases as database queries are stacked up in a buffer waiting to be used by the database. One way to address this issue may be to distribute data between a plurality of databases to improve query responsiveness. However, as the number of databases increases, the likelihood that duplicate database record identifiers may be generated increases, especially when databases may be cloned or copied to generate new databases. Also, when the number of database record identifiers becomes so great, the likelihood of duplicate identifiers may become an issue without careful consideration and planning. This disclosure describes at least one way to reduce the likelihood of duplicate record identifiers.

This disclosure relates to generating unique identifiers for database records that may maintain a high probability of uniqueness as the number of databases expands within a network. In some instances, the database network may cover one or more business units, one or more services, and/or one or more regions or markets. Organizing or arranging the databases may be done in several different ways. In one embodiment, a distributed database architecture may be implemented to arrange and organize the databases within a network. The distributed database architecture may increase the number of databases in a lateral and/or vertical manner within a tiered hierarchy. The new databases may be given a new database name and a new database identifier and arranged with the b-tree data structure as needed. In some instances, the database identifier may be incorporated into the data record identifier for each of the data records stored within the database. The data record identifier may also include a sequence value that is unique within the database. In one embodiment, the database identifier may be modified to increase its probability of uniqueness. For example, the database name may be converted to a numerical representation of the name and may be hashed along with the database identifier. The hashing process may continue until reaching a significantly large number that exceeds or equals a predetermined threshold. In this way, incorporating or integrating several identifiers of varying uniqueness together to form an integrated identifier is likely to increase the probability of uniqueness for the database identifier. Therefore, duplicating a data record identifier will be less likely as the database grows, is cloned, or is copied.

Illustrative System

Figure 1:
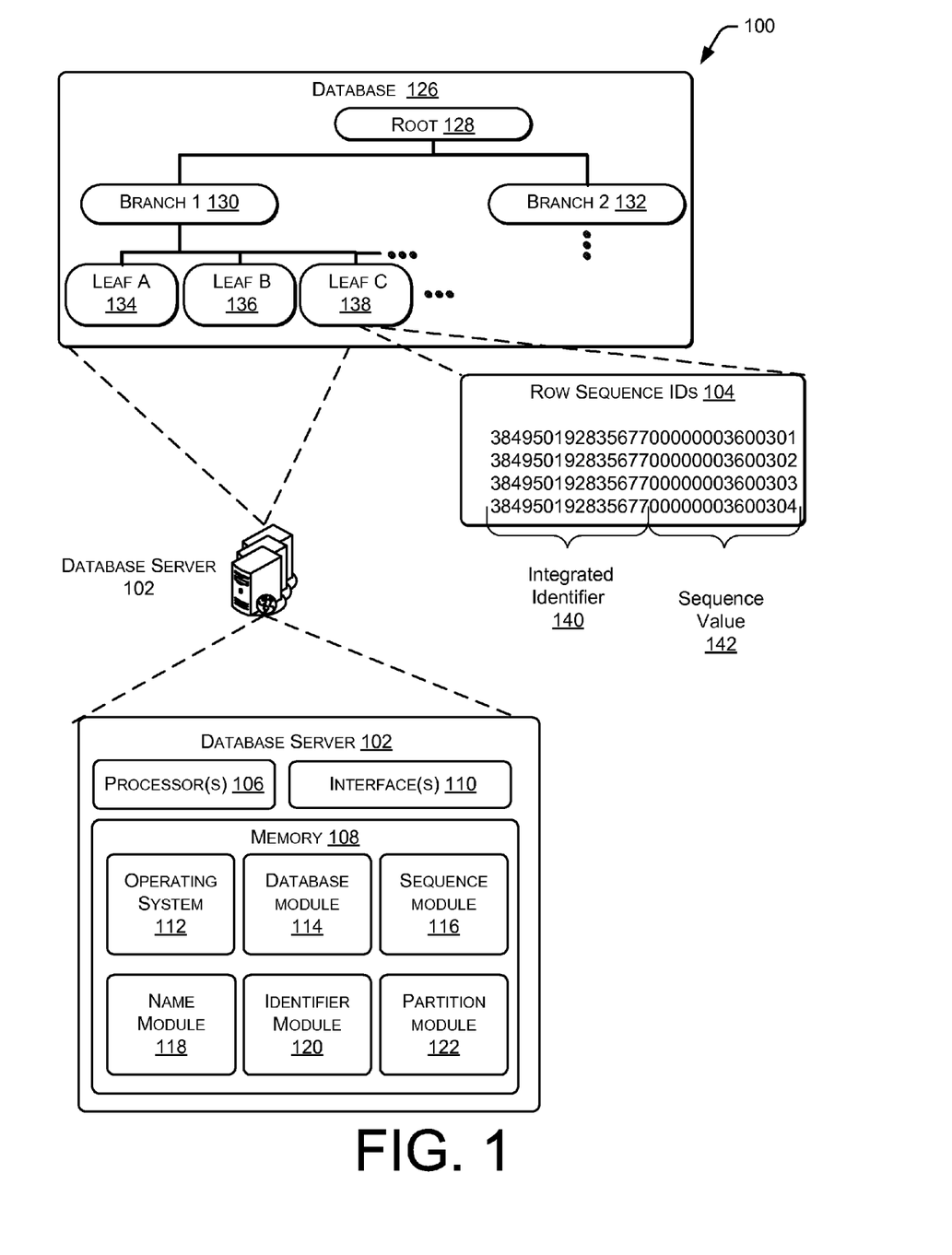
FIG. 1 illustrates a system for generating integrated identifiers for database records in accordance with one or more embodiments of the disclosure.

FIG. 1 illustrates a system 100 for generating database record identifiers in a way that will increase their uniqueness within a database network. The system 100 may include a database server 102 that manages one or more databases and their respective row sequence or record identifiers 104. While a single database server 102 is shown, it is understood that the system 100 may include more than one database server 102 that are coupled to each other over a network.

The database server 102 may include one or more processors 106, a memory 108, and one or more interfaces 110 to communicate with additional content servers (not shown) and other devices (not shown) over a network (not shown).

The computer processors 106 may comprise one or more cores and are configured to access and execute (at least in part) computer-readable instructions stored in the one or more memories 108. The one or more computer processors 106 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The database server 102 may also include a chipset (not shown) for controlling communications between the one or more processors 106 and one or more of the other components of the database server 102. In certain embodiments, the database server 102 may be based on an Intel® architecture or an ARM® architecture and the processor(s) 106 and chipset may be from a family of Intel® processors and chipsets. The one or more processors 106 may also include one or more application-specific integrated circuits (ASICs) or application-specific standard products (ASSPs) for handling specific data processing functions or tasks.

The interfaces 110 may also comprise one or more communication interfaces (or network interface devices) to provide for the transfer of data between the database server 102 and another device directly such as in a peer-to-peer fashion, via a network, or both. The communication interfaces may include, but are not limited to: personal area networks ("PANs"), wired local area networks ("LANs"), wireless local area networks ("WLANs"), wireless wide area networks ("WWANs"), and so forth. The wireless system interfaces may include the hardware and software to broadcast and receive messages either using the Wi-Fi Direct Standard (See Wi-Fi Direct specification published in October 2010) and/or the IEEE 802.11 wireless standard (See IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the database server 102 and another device such as an access point, a host computer, a server, a router, a reader device, another database server 102, and the like. The network may include, but is not limited to: the Internet, a private network, a virtual private network, a wireless wide area network, a local area network, a metropolitan area network, a telephone network, and so forth.

The one or more memories 108 comprise one or more computer-readable storage media ("CRSM"). In some embodiments, the one or more memories 108 may include non-transitory media such as random access memory ("RAM"), flash RAM, magnetic media, optical media, solid state media, and so forth. The one or more memories 108 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 108 may store an operating system 112 that includes a plurality of computer-executable instructions that may be implemented by the processor 106 to perform a variety of tasks to operate the interface(s) 110 and any other hardware installed on the database server 102. The memory 108 may also include: a database module 114, a sequence module 116, a name module 118, an identifier module 120, and a partition module 122.

The database module 114 may store, manage, and organize any or all databases within the database server 102 or within a network of database servers (not shown). The types of databases may include, but are not limited to: a hierarchical database, a relational database, an active database, a cloud database, a distributed database, and/or any other type of database that is organized to store data. The database module 114 may include a database management system that manages the creation, maintenance, and use of the database. This may include, but is not limited to, security, data integrity, concurrency control, data recovery, and/or queries. In one embodiment, the database module 114 may implement a b-tree data structure as shown in database 126 in FIG. 1.

Generally, a b-tree data structure may comprise a root 128, one or more branches 130, 132, and one or more leaves per branch (e.g., leaf A 134, leaf B 136, and leaf C 138). In this simplified example, the data may be stored at leaves in rows that are accessible and managed by the database management system. In one embodiment, this may be accomplished by using row sequence identifiers 104 that may include an integrated identifier 140 and a sequence value 142 that are associated with a data record (not shown). The combination of the integrated identifier 140 and the sequence value 142 may be used to provide a unique value that the database management system may use to track, access, or manage the data within the leaf C 138 of the database 126. For example, a unique sequence value 142 may be associated with each data record in the leaf C 138. In this way, the sequence values 142 may provide a way to distinguish between the data stored within the leaf C 138. In this embodiment, the sequence values may be sequential as shown in the illustrated row sequence identifiers 104 (e.g., . . . 01, . . . 02, . . . 03). However, the row sequence identifiers 104 may also be easily distinguishable from data stored in other leaves 134, 136, other branches 132, and other databases (not shown) managed by the database server 102. The integrated identifier 140 may provide a unique value that would be distinguishable over other row identifiers that may be used by the database 126 or any other database managed by the database server 102. Accordingly, the uniqueness of the integrated identifier 140 may be based on, but not limited to, the number of digits and how the number is derived. In one embodiment, the integrated identifier 140 may be at least 10^15 to provide enough latitude to create unique identifiers for a very large sample of data records. The values of the integrated identifier may also be critical to generating unique values to fill the 10^15 space. In one embodiment, the integrated identifier 140 may be based in part on several components that may be integrated into a single value. For example, the database 126 may include an identifier that may be based on a large number that may be based on a time and/or date that the database was created. This number may be randomly generated and may be cross referenced against existing identifiers to ensure that the number is unique to the system 100. However, the uniqueness of the identifier may be improved by incorporating additional unique elements into the integrated identifier 140. For example, the name of the database may also have unique characteristics, in that the database server 102 may attempt to use different names for the databases that it manages. Therefore, by combining the two or more unique (or semi-unique) properties of the database into an integrated identifier 140, the row identifier's probability of being unique may increase. The higher the probability of uniqueness will make it less likely for the database server 102 (or another database server) to generate a duplicate row identifier. The integrated identifier 140 will be discussed in greater detail below in FIG. 2 and the identifier module 120.

The sequence module 116 may generate sequence values 142 that may be unique within each database 126, branch 130, 132, and/or leaf 134, 136, 138. In this way, the sequence values may distinguish between identifiers within a group or subset of data records. For example, the sequence values 142 may be unique for each data record in the leaf C 138. In one embodiment, the sequence values 142 may be sequential, as shown in FIG. 1. However, the sequence values may be incremented or sequenced in a variety of ways as long as they are not duplicated within certain group data records or a subset of the group data records. For example, the sequence values may be incremented in a systematic way (e.g., by 1, 2, 3 . . . or "n" increments) or randomly (as needed) as long as they are not duplicated within their designated group.

The name module 118 may generate names for the databases or the components of the databases (e.g., branches 130, 132 or leaves 134, 136, 138). Generally, the names may also have a probability of uniqueness in order to distinguish them from each other. For example, the names may be numeric or alphanumeric, and may follow a naming scheme set by the service owners. The names may also reference the type of data being stored (e.g., sales, billing, customer, product information), the origin of the data (e.g., region name, business name), an iteration of the number of related databases, and/or any other property or characteristic associated with the data. For example, the database 126 may be named customer3EU meaning that it is the third customer database for the European Union region which may be differentiated from the customer1EU and the customer2EU databases.

The name module 118 may also convert the alphanumeric or text database names into a numeric format that may be more easily combined with the other values that may be used to generate the integrated identifier. In one embodiment, the database name may be converted to a different format using the American Standard Code for Information Interchange values. However, any other conversion or encoding scheme may be used to convert the database name if the conversion is needed. In some embodiments, the database name may not be converted. Following the conversion, the new string or name may be incorporated into the integrated identifier 140.

The identifier module 120 may generate the identifier for each database and the integrated identifier 140 by incorporating other unique features or properties related to the database 126 (e.g., the database name). The identifier may incorporate a probability of uniqueness that enables the database server 102 to distinguish between each of the databases within the system 100. For example, the identifier may incorporate the time (or the day) in which the identifier was created. The time or day may be used based (at least in part) on the frequency of database generation. For example, the time stamp or interval may be able to delineate between each database such that the databases may indicate a different time for each database. This may be done in second, minute, or sub-second intervals depending on how fast the database server 102 may generate identifiers. In addition to the time stamp, additional properties may also be incorporated into the identifier. For example, the time stamp may be appended by an incremented value that may indicate how many databases may have been created within a certain time window. The additional value may indicate that the identifier was for the "xth" database created within a certain time window. The time window may include a 12 or 24 hour period (or any other period that may be useful) based on the number of databases being created. For example, the identifier may have been created at noon on Oct. 10, 2012 and has the time/date stamp 1010121200. The identifier may have been for the 256$^{th}$ database created on that day. Hence, the time/date stamp may be modified to 1010121200256. Once the identifier has been determined, it may be combined with other components of the integrated identifier 140.

In one embodiment, the identifier may be combined with the database name to generate the integrated identifier 140. The identifier module 120 may hash the identifier and the database name to a single value that forms the integrated identifier 140. The hashing process should lead to a sufficiently large integrated identifier 140 to impart a high level of uniqueness. For example, the integrated identifier 140 may be at least 10^15 digits. The hashing process may include, but is not limited to, string hashing, cryptographic hashing, or geometric hashing.

The partition module 122 may generate clones or copies of existing databases in conjunction with the database module 114. A database may be cloned for its data structure rather than for the data itself. For example, if it is desired to add a new shard (e.g., a new partition) to a database, the database may be cloned to help ensure that all of the data structures (e.g., tables, indexes, and privileges) are identical. In certain embodiments, the actual data (e.g., transactional data) is not kept when cloning a database for the purpose of adding a new shard. Databases may be cloned to create backups for maintaining data integrity during database server 102 upgrades; or, when one or more database servers are unavailable due to maintenance or unplanned disruptions. A new or cloned database created from an existing database may receive a new database identifier, a new name, and a new integrated identifier. However, the cloned database may continue to use the same sequence value 142 scheme of the original database. The partition module 122 may select a database for cloning and then ensure that the cloned database has a new name from the name module 118, a new identifier, and a new integrated identifier from the identifier module 120 before being released for use. The new databases may be added horizontally to the existing database structure thus increasing the amount of existing databases. This horizontal partitioning may also be referred to as sharding (e.g., where shards correspond to partitions). For example, leaf B 136 may have been sharded (or horizontally partitioned) to generate leaf C 138. The partitioning process will be described in greater detail in the description of FIG. 3A below.

Figure 2A:
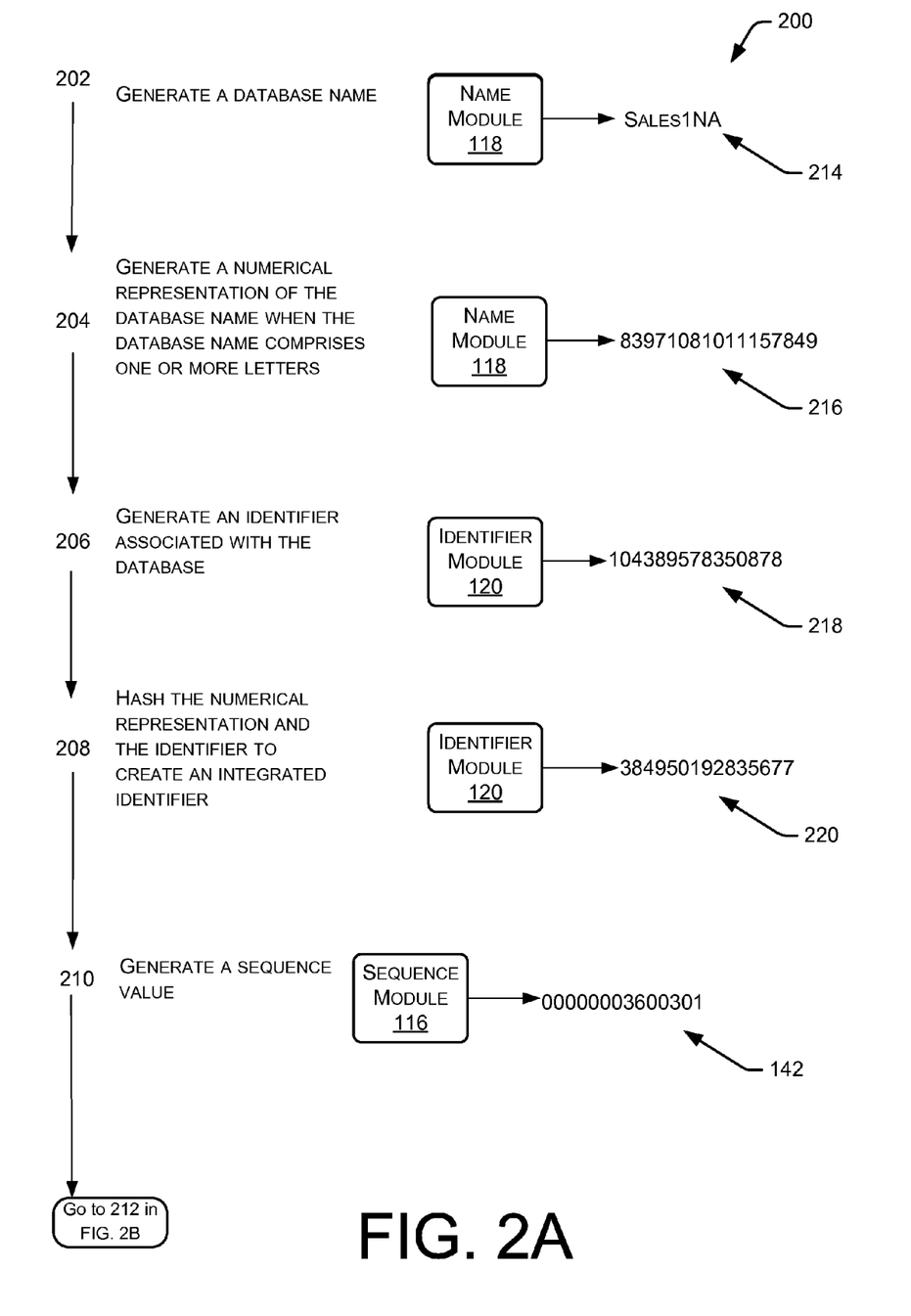
FIGS. 2A-2B illustrate a flow diagram with accompanying illustrations of a method for generating integrated identifiers for database records in accordance with one or more embodiments of the disclosure.
Figure 2B:
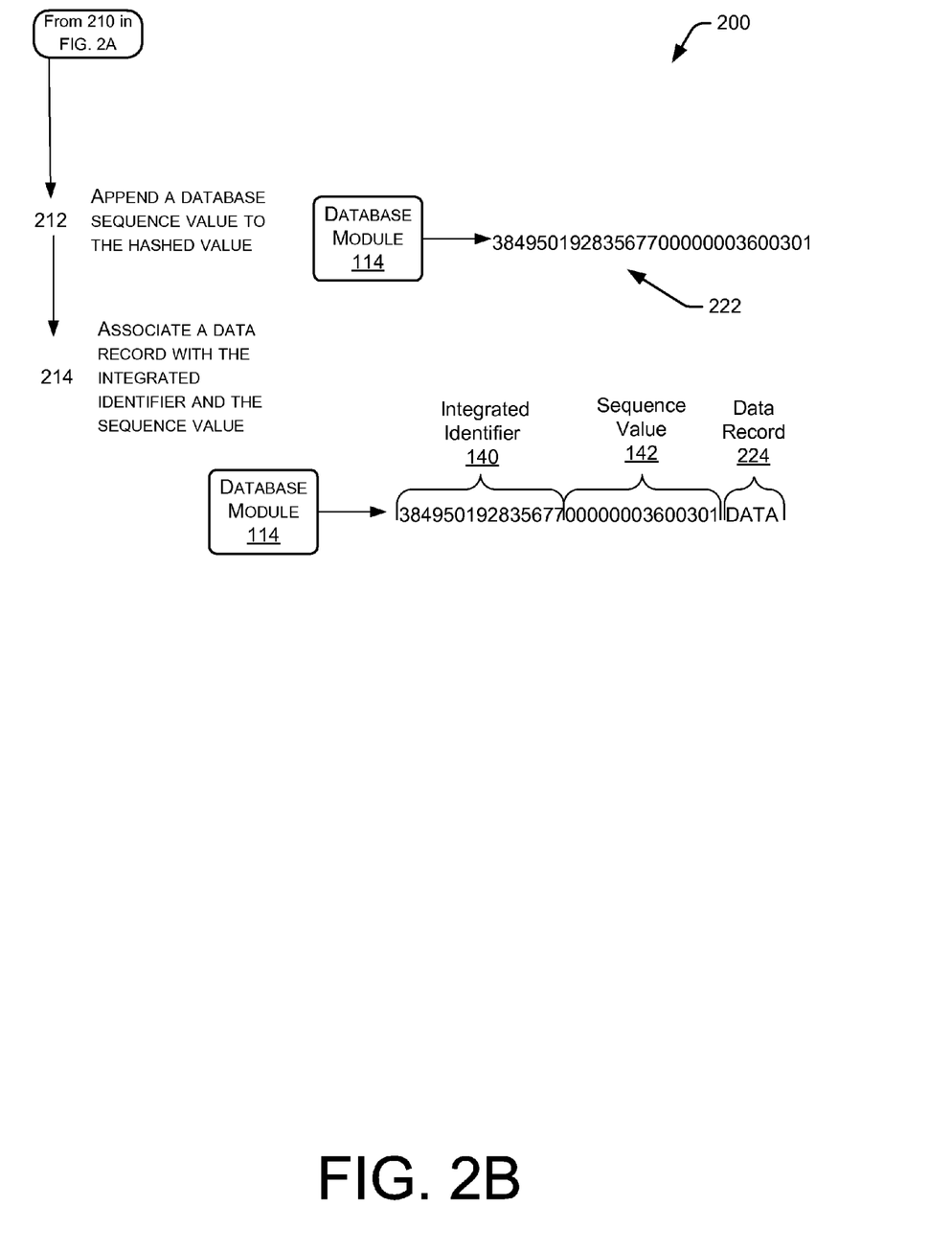

FIGS. 2A and 2B illustrate a flow diagram with accompanying illustrations of a method 200 for generating unique row sequence identifiers 104 for a database 126 using a database name 216 and a database identifier 218 to generate an integrated identifier 140. The integrated identifier 140 may be "globally unique" across the databases managed by the database server 102. "Globally unique" may mean that there is a very small likelihood that the database server 102 may generate a duplicate integrated identifier 140. The method 200 illustrates one embodiment of how to generate an integrated identifier 140. It should be noted that in other embodiments the sequencing of the method 200 may be altered and some steps may be omitted.

At block 202, the name module 118 may generate a database name 214 when the database module 114 determines a new database is needed. The name may follow any naming protocol selected by the service owner and may include: a reference to the type of data, the origin of the data, the hierarchy of the database, or the purpose of the data. For example, the name 214 may be Sales1NA indicating that the new database may be the first sales database for the North American region. Although this embodiment indicates the database name 214 may be an alphanumeric value, the naming convention may include only numbers or may include any other symbol or mark.

At block 204, the name module 118 may convert the alphanumeric name 214 to American Standard Code for Information Interchange (ASCII) code, characters, or values. However, the name module 118 may convert the name 214 to any appropriate format that is conducive to hash or to combine with other values that may be incorporated into the integrated identifier 140.

At block 206, the identifier module 120 may generate an identifier 218 for the new database. The identifier 218 may include any value, character, or symbol that may be hashed with or combined with any other strings that may be used to generate the integrated identifier 140. In one specific example, the identifier 218 may include the value 104389578350878.

At block 208, the identifier module 120 may hash the identifier 218 and the name 216 to generate the integrated identifier 140. The hashing process may include any hashing technique preferred by the service owner. The hashing techniques may include, but are not limited to, string hashing or geometric hashing. In one embodiment, the integrated identifier 140 should be a string or value with at least 15 digits. In one specific embodiment, the integrated identifier 220 may be 384950192835677.

At block 210, the sequence module 116 may generate a sequence value 142 that may be used to distinguish rows within a database. The sequence values 142 may be sequential, as shown in FIG. 1. However, the sequence values may be incremented or sequenced in a variety of ways as long as they are not duplicated within certain group data records or a subset of the group data records. For example, the sequence values may be incremented in a systematic way (e.g., by 1, 2, 3 . . . or "n" increments) or randomly (as needed) as long as they are not duplicated within their designated group.

At block 212, the database module 114 may receive a sequence value 142 or a sequence scheme from the sequence module 116. The database module 114 may append the sequence value 142 to the integrated identifier 220. It may also generate a sequence value 142 in view of the sequence scheme and append the sequence value 142 to the integrated identifier 220 to form a row identifier 222 for the database 126. In one specific embodiment, the row identifier 220 may be 384950192835677000000003600301.

At block 214, the database module 114 may assign a data record 224 to the row identifier 222. The data record 224 may be any type of information or data that may be stored in a database 126.

Figure 3A:
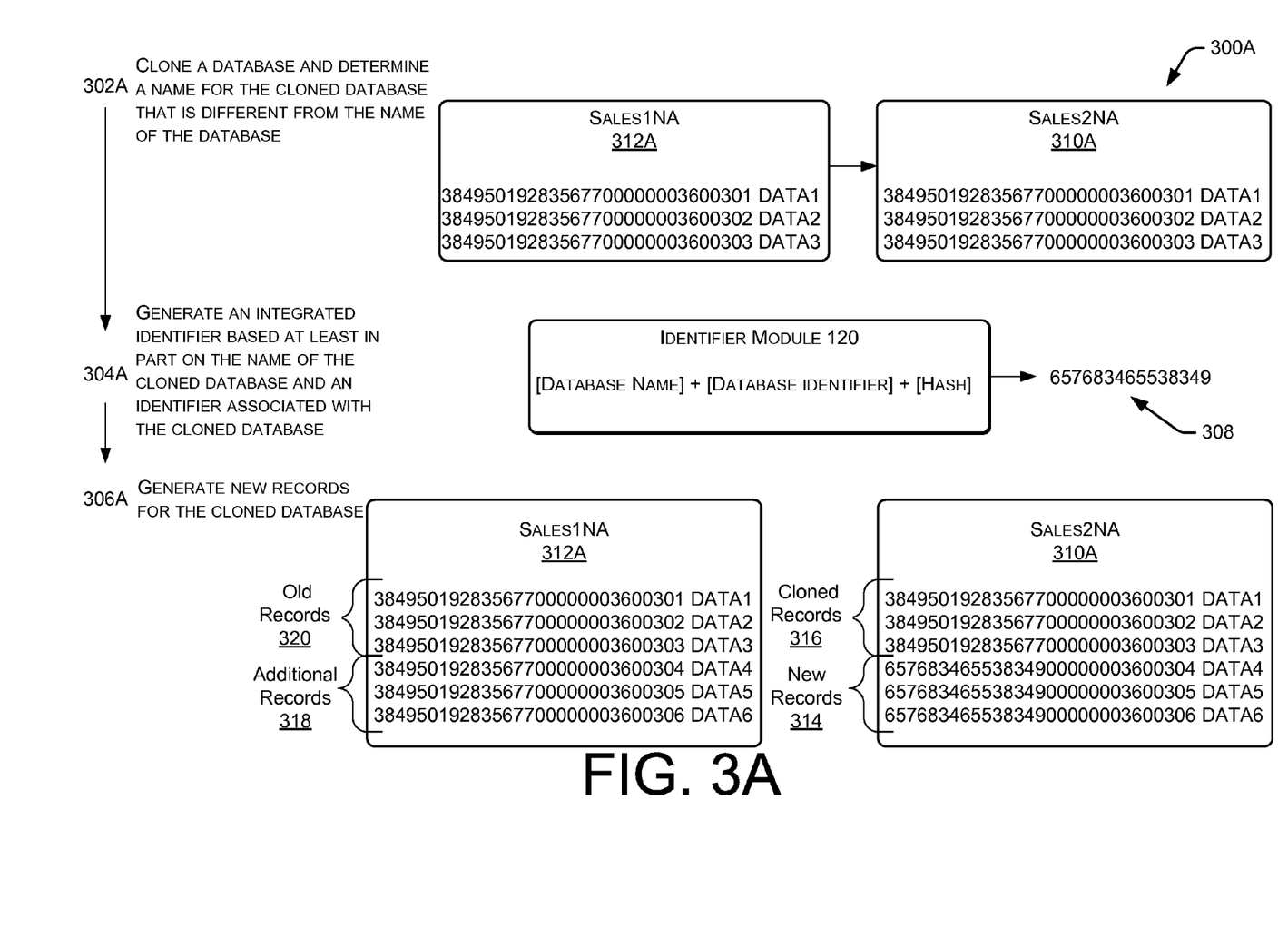
FIG. 3A illustrates a flow diagram with accompanying illustration of a method for cloning a database and incorporating a new integrated identifier into the cloned database that includes cloned data in accordance with one or more embodiments of the disclosure.

FIG. 3A illustrates a flow diagram with accompanying illustration of a method 300A for cloning a database 126 and incorporating a new integrated identifier 308 into a cloned database 310A derived from an existing database 312A. In general, the cloned database 310A may need the new identifier 308 to prevent duplicating identifiers between the new and old databases. This may be especially important if the cloned database 310A intends to use the same sequencing scheme as the existing database 312A. Method 300A may also apply to new databases that are copied or replicated from an existing database. Cloning, copying, or replicating databases may be done to provide data integrity for existing databases, to add additional storage capacity, or increase transactional throughput.

At block 302A, the existing database 312A may be cloned to create a cloned database 310A that at least includes, but is not limited to, the row identifiers and their associated data records. The cloned database may also be copied, replicated, or may use any other technique in which the row identifiers and data records are transferred to another database. The database module 114 may receive the new name (e.g., Sales2NA) from the name module 118. The name may be generated based (at least in part) on a naming scheme stored at the database module 114 or the name module 118. The identifier module 120 may also generate another identifier that is associated with the database. In one embodiment, the identifier may be a database identifier that the database module may use to differentiate the cloned database from other databases 126, 312A.

At block 304A, the identifier module 120 may generate an integrated identifier 308 based, at least in part, on the database name and the database identifier. In another embodiment, the integrated identifier 308 or cloned database 310A may be generated based, at least in part, on the database name, database identifier, and a hashing process similar to the one described above in the description of FIGS. 1 and 2. In one specific embodiment, the integrated identifier may be 657683465538349 using the database name, database identifier, and the hashing process.

At block 306A, the database module 114 may associate new data records 314 to the cloned database 310A, which is illustrated at the lower right-hand portion of FIG. 3A. The new data records may be appended to the cloned data records 316 and may use the same sequencing scheme as the existing database. The existing database 312A may also be populated with additional records 318 (see the lower left-hand portion of FIG. 3A) that still use the existing integrated identifier 140 that was associated with the old records 320 that were present prior to cloning.

Figure 3B:
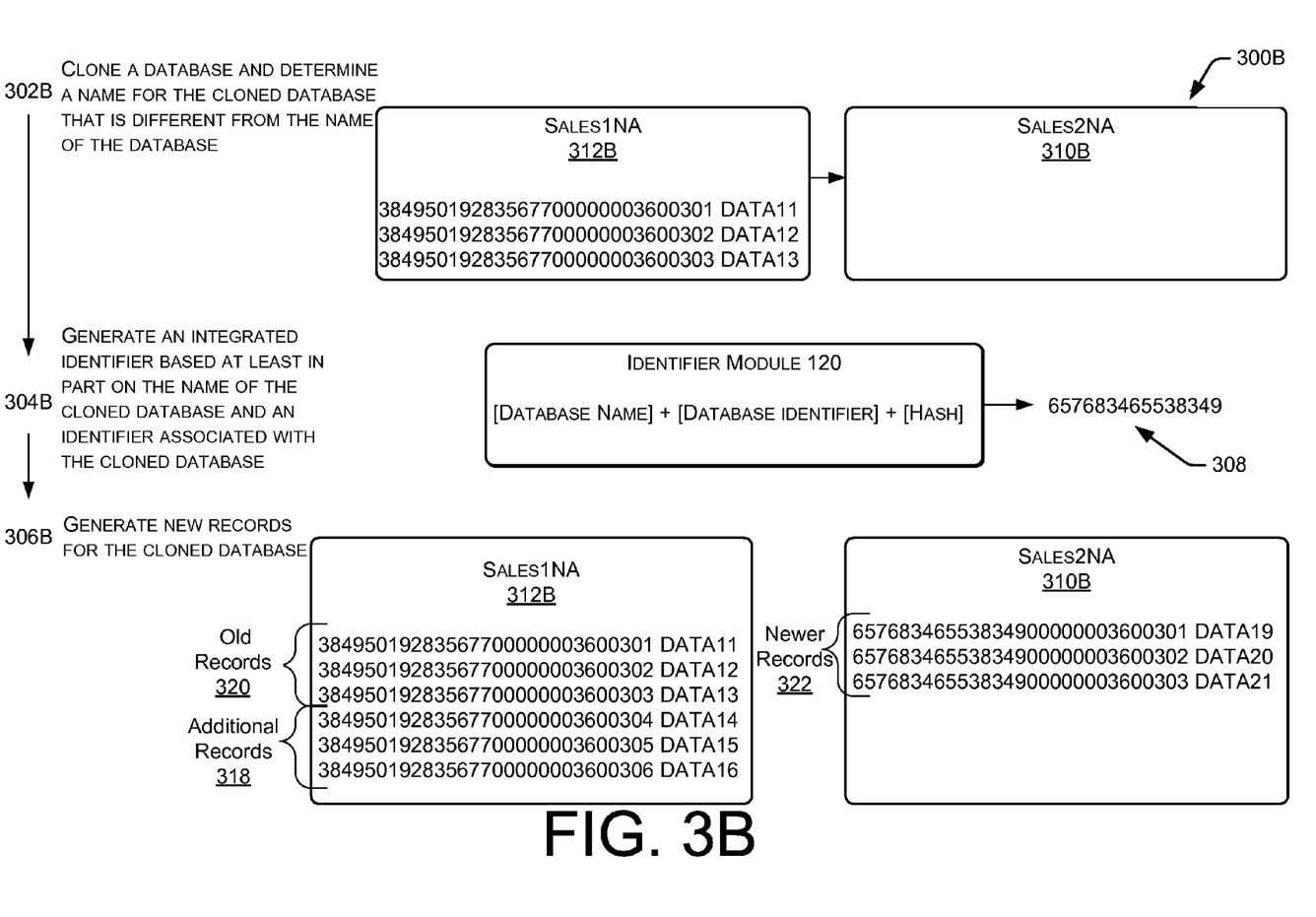
FIG. 3B illustrates a flow diagram with accompanying illustration of a method for cloning a database and incorporating a new integrated identifier into the cloned database that may not include cloned data in accordance with one or more embodiments of the disclosure.

FIG. 3B illustrates a flow diagram with accompanying illustration of a method 300B for cloning a database 126 and incorporating a new integrated identifier 308 into a cloned database 310B. However, in this embodiment, the old data records 320 may not be incorporated into the cloned database 310B. In general, the cloned database 310B may need the new identifier 308 to prevent duplicating identifiers between the new and old databases. This may be especially important if the cloned database 310B intends to use the same sequencing scheme as the existing database 312B. Method 300B may also apply to new databases that are copied or replicated from an existing database. Cloning, copying, or replicating databases may be done to provide data integrity for existing databases, to add additional storage capacity, or increase transactional throughput.

At block 302B, the existing database 312B may be cloned to create a cloned database 310B that at least includes, but is not limited to, the row identifiers and their associated data records. The cloned database may also be copied, replicated, or may use any other technique in which the row identifiers and data records are transferred to another database. The database module 114 may receive the new name (e.g., Sales2NA) from the name module 118. The name may be generated based (at least in part) on a naming scheme stored at the database module 114 or the name module 118. The identifier module 120 may also generate another identifier that is associated with the database. In one embodiment, the identifier may be a database identifier that the database module may use to differentiate the cloned database from other databases 126, 312B.

At block 304B, the identifier module 120 may generate an integrated identifier 308 based, at least in part, on the database name and the database identifier. In another embodiment, the integrated identifier 308 may be generated on the database name, database identifier, and a hashing process similar to the one described above in the description of FIGS. 1 and 2. In one specific embodiment, the integrated identifier may be 657683465538349 using the database name, database identifier, and the hashing process.

At block 306B, the database module 114 may associate newer data records 322 to the cloned database 310B, which is illustrated at the lower right-hand portion of FIG. 3B. In this instance, the cloned database 310B may include the properties or characteristics of the existing database 312B, but may not include the old records 320. The newer data records 322 may be added to the cloned database 310B as needed. The newer data records 322 may use the same sequencing scheme as the existing database 312B or a new sequencing scheme. The existing database 312B may also be populated with additional records 318 (see the lower left-hand portion of FIG. 3B) that still use the existing integrated identifier 140.

Figure 4:
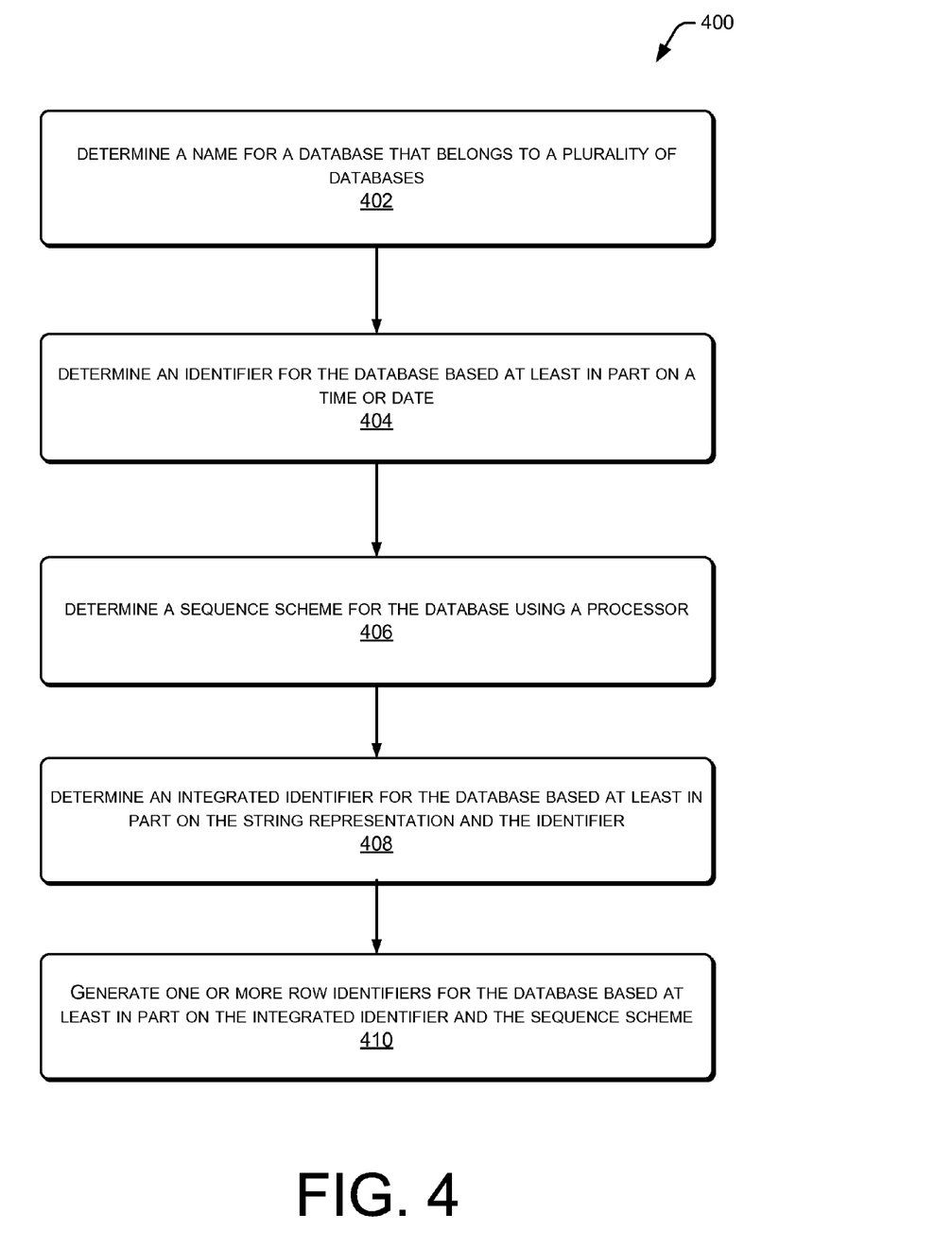
FIG. 4 illustrates a flow diagram for a method for generating integrated identifiers for database records in accordance with one or more embodiments of the disclosure.

FIG. 4 illustrates a flow diagram for a method 400 for generating integrated identifiers 140 (FIG. 1) to be used as row sequence identifiers 104 for a data record 224 (FIG. 2B). Method 400 is directed from the point of view of the database server 102 and its module components. In general, the databases may use an identification convention that enables the database server 102 to locate discrete data records using a single identifying feature. The identifying feature may be a combination of the integrated identifier 140 with a sequence value 142. In the combination embodiment, the integrated identifier 140 may have a strong probability of uniqueness among the identifiers of the other databases and the sequence value may have a strong probability of uniqueness within the database itself. In this way, the combination minimizes the likelihood a duplicate identifier even if the data record 224 is moved between different databases.

At block 402, the name module 118 may determine a name for a database that belongs to a plurality of databases managed by the database server 102. The database may be a new database being created to add additional storage capacity, processing capacity, memory capacity, and/or throughput capacity for the databases managed by the database server 102. The databases may be arranged in any database architectural framework.

At block 404, the identifier module 120 may determine an identifier 218 (FIG. 2A) for the database based, at least in part, on a time or date associated with the database or the identifier. For example, the time or date may relate to the creation of the database or the identifier 218. The identifier may have a relatively high probability of uniqueness between the other database identifiers associated with the database server 102 or the plurality of databases.

At block 406, the sequence module 116 may select a sequence scheme for the database. The scheme may comprise one or more strings or numbers that have a relatively high probability of uniqueness to each other. The uniqueness may be based upon the number of digits (or letters) and their arrangement with respect to each other. For example, the number of digits or letters may be greater than 10.

At block 408, the identifier module 120 may generate or determine an integrated identifier 140 for the database. The integrated identifier 140 may comprise a combination of the identifier 218 and the name 216. In one embodiment, the combination may be done by appending the identifier 218 and the name 216 together. In another embodiment, the identifier 218 and the name 216 may be hashed to generate a sufficiently large number that comprises a relatively high probability of uniqueness with other integrated identifiers. In one specific instance, the number of digits of the integrated identifier may be at least ten. The hashing process may be completed by any type of hashing technique. In one specific embodiment, the hashing process may include a string hashing technique or a geometric hashing technique.

At block 410, the database module 114 may generate one or more row sequence identifiers 104 based, at least in part, on the integrated identifier 140 and a sequence value 142. The database module 114 may assign individual data records 224 to each of the row sequence identifiers 104. In this way, the database server 102 may be able to distinguish between data records 224 regardless of which database (or sequence within the database) where the data records 224 may be stored.

Figure 5:
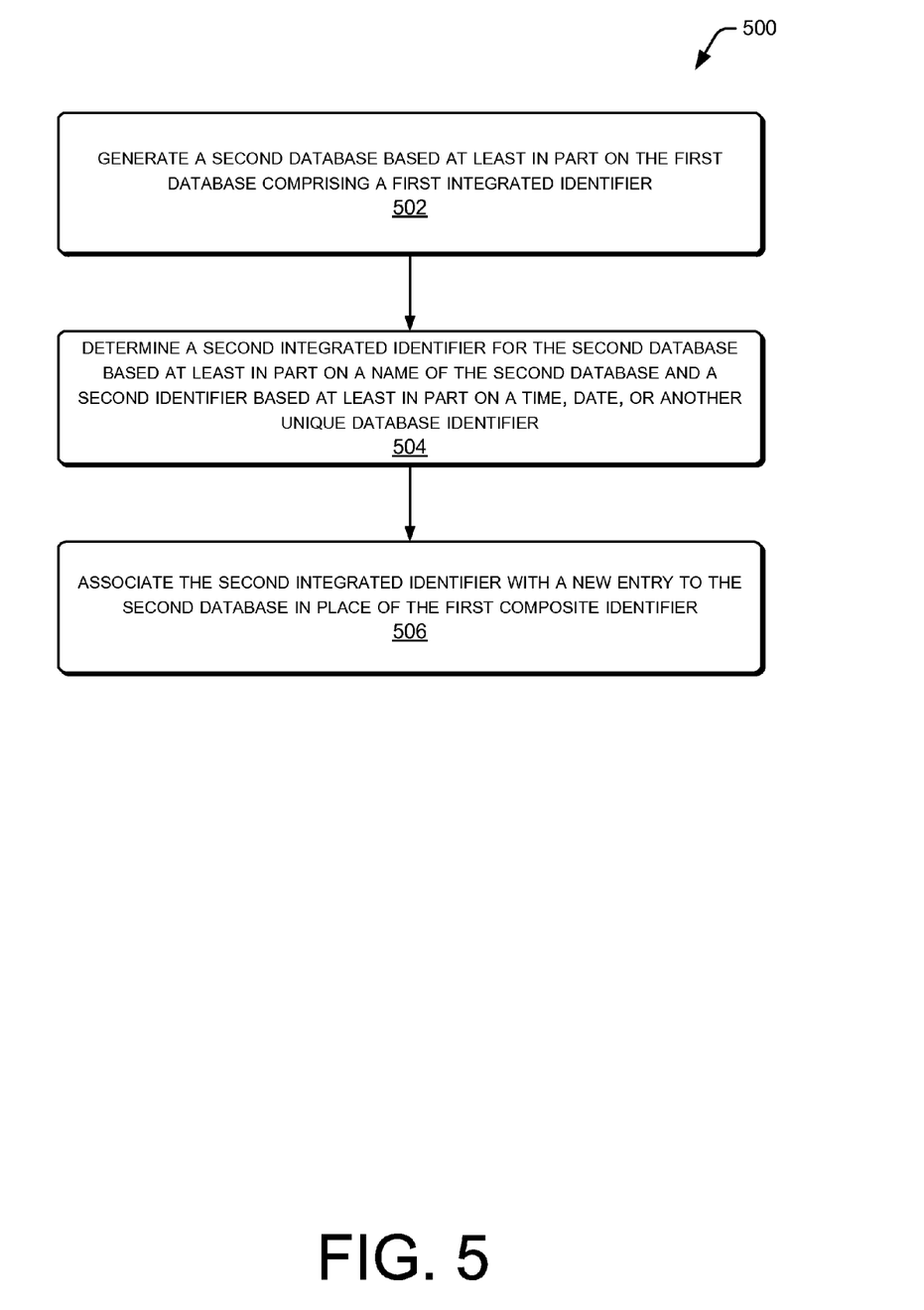
FIG. 5 illustrates a flow diagram for a method for generating integrated identifiers for a cloned database in accordance with one or more embodiments of the disclosure.

FIG. 5 illustrates a flow diagram for a method 500 for generating integrated identifiers 308 for a cloned database (e.g., 310A and 310B of FIGS. 3A and 3B, respectively) based, at least in part, on an existing database (e.g., 312A and 312B). As noted above in the description of FIGS. 1 and 3, the cloned database may be generated for maintaining backups for data integrity purposes or to decrease the relative size of existing databases by adding additional databases. In method 500, the first database is an existing database (e.g., 312A and 312B).

At block 502, the database module 114 may generate a second database (e.g., 310A and 310B) either by copying, cloning, replicating, or transferring data from the first database. The second database may also be given a name and an identifier that is different from the first database or the plurality of databases. The identifier may also be based on a time or date associated with the second database or the identifier. The first database may include a first integrated identifier 140 similar to the one described in the description of FIG. 4.

At block 504, the identifier module 120 may generate a second integrated identifier 308 for the second database. The second integrated identifier 308 may be a string of digits or information similar to the first integrated identifier 140.

At block 506, the database module 114 may add new data records 224 to the second database 310. The new data records 314 may be associated with a row identifier that comprises the second integrated identifier 308 and a unique sequence value in database 310A located in the lower right portion of FIG. 3A. The cloned or copied data records 316 may remain unedited and may continue to be referenced by the database server 102. This may be accomplished based in part on the integrated identifier 140 having a relatively high probability of uniqueness that does not require to be updated when a data record is moved from the first database to the second database.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
    at least one interface device configured to communicate with one or more computing devices;
    at least one memory that stores computer-executable instructions and a plurality of databases; and
    at least one processor configured to access the at least one interface device and the at least one memory and execute the computer-executable instructions to:
        convert an alphanumeric name of a first database of the plurality of databases to a set of American Standard Code for Information Interchange (ASCII) values;
        determine a database identifier for the database based at least in part on a time or a date associated with creation of the first database;
        execute a hash function on the set of ASCII values and the database identifier to generate a unique composite identifier for the first database;
        determine a sequence value based at least in part on a sequence scheme associated with the first database, wherein the sequence value is unique within the first database;
        generate a data record identifier for a data record based at least in part on the composite identifier and the sequence value;
        store the data record in the first database; and
        associate the data record identifier with the data record, wherein the data record identifier uniquely identifies the data record across a plurality of databases.

2. The system of claim 1, wherein the composite identifier is a first composite identifier, the alphanumeric name is a first alphanumeric name, the set of ASCII values is a first set of ASCII values, the database identifier is a first database identifier, the data record is a first data record, and the data record identifier is a first data record identifier, and wherein the at least one processor is further configured to execute the computer-executable instructions to:
    generate a second database comprising a second alphanumeric name that is different from the first alphanumeric name of the first database;
    copy contents of the first database into the second database;
    convert the second alphanumeric name to a second set of ASCII values;
    determine a second database identifier for the second database based at least in part on a time or a date associated with generation of the second database, the second database identifier uniquely identifying the second database among the plurality of databases;
    execute a hash function on the second set of ASCII values and the second database identifier to generate a unique second composite identifier for the second database;
    generate a second data record identifier for a second data record based at least in part on the second composite identifier;
    store the second data record in the second database; and
    associate the second data record identifier with the second data record, wherein the second data record identifier uniquely identifies the second data record across the plurality of databases.

3. The system of claim 1, wherein the composite identifier begins with a non-zero number.

4. The system of claim 1, wherein the alphanumeric name comprises a reference to: a type of data stored in the first database, an index value, and a geographical region.

5. A system, comprising:
    at least one interface device configured to communicate with one or more computing devices;
    at least one memory that stores computer-executable instructions and a plurality of databases; and
    at least one processor configured to access the at least one interface device and the at least one memory and execute the computer-executable instructions to:
        determine a database name for a first database of the plurality of databases;
        determine a database identifier for the first database;

determine a sequence value that is unique within the first database;

determine a composite identifier for the first database based at least in part on the database name and the database identifier;

generate a data record identifier for a data record based at least in part on the composite identifier and the sequence value;

store the data record in the first database; and associate the data record identifier with the data record, wherein the data record identifier uniquely identities the data record across the plurality of databases.

6. The system of claim 5, wherein the composite identifier is a first composite identifier, the database name is a first database name, the database identifier is a first database identifier, the data record is a first data record, and the data record identifier is a first data record identifier, and wherein the at least one processor is further configured to execute the computer-executable instructions to:

generate a second database based at least in part on the first database;

determine a second composite identifier for the second database based at least in part on a second database name of the second database and a second database identifier of the second database;

determine a second data record identifier for a second data record based at least in part on the second composite identifier;

store the second data record in the second database; and associate the second data record identifier with the second data record.

7. The system of claim 5, wherein the at least one processor is configured to determine the composite identifier by executing the computer-executable instructions to hash the database name and the database identifier to generate a value that exceeds or is equal to a predetermined threshold.

8. The system of claim 6, wherein the sequence value is a first sequence value, and wherein the at least one processor is further configured to execute the computer-executable instructions to:

determine a second sequence value that is unique within the second database; and generate the second data record identifier by concatenating the second composite identifier and the second sequence value.

9. The system of claim 6, wherein the at least one processor is further configured to:

copy the first data record to the second database, wherein the first sequence value is unique within the second database; and delete the first data record from the first database.

10. The system of claim 5, wherein the database name comprises an alphanumeric string, and wherein the at least one processor is configured to determine the database name by executing the computer-executable instructions to convert the alphanumeric string based at least in part on an American Standard Code for Information Interchange encoding scheme.

11. The system of claim 5, wherein at least two databases of the plurality of databases are organized in a horizontally partitioned manner.

12. The system of claim 5, wherein the sequence value is unique within the first database and the composite identifier comprises a string that is unique across the plurality of databases.

13. A method comprising:

determining a database name for a first database of a plurality of databases in memory;

determining a database identifier for the first database;

determining a sequence value that is unique within the first database;

determining an integrated identifier for the first database based at least in part on the database name and the database identifier;

generating a data record identifier for a data record based at least in part on the integrated identifier and the sequence value;

storing the data record in the first database; and associating the data record identifier with the data record, wherein the data record identifier uniquely identifies the data record across the plurality of databases.

14. The method of claim 13, wherein the integrated identifier is a first integrated identifier, the database name is a first database name, the database identifier is a first database identifier, the sequence value is a first sequence value, the data record is a first data record, and the data record identifier is a first data record identifier, the method further comprising:

generating a second database based at least in part on the first database;

determining a second integrated identifier for the second database based at least in part on a second database name of the second database and a second database identifier of the second database;

determining a second sequence value that is unique within the second database;

determining a second data record identifier for a second data record based at least in part on the second integrated identifier and the second sequence value;

storing the second data record in the second database; and associating the second integrated identifier with the second data record, wherein the second data record identifier uniquely identifies the second data record across the plurality of databases.

15. The method of claim 13, wherein the database name comprises a string, and wherein determining the integrated identifier comprises hashing the string and the database identifier to generate a value that exceeds or is equal to a predetermined threshold.

16. The method of claim 13, wherein determining the database identifier comprises determining the database identifier based at least in part on at least one of a time stamp or a date stamp.

17. One or more non-transitory computer-readable media storing computer-executable instructions that, when executed by at least one processor, configure the at least one processor to perform operations comprising:

determining a database name for a first database of a plurality of databases;

determining a database identifier for the first database;

determining an integrated identifier for the first database based at least in part on the database name and the database identifier;

determining a sequence value that is unique within the first database;

generating a data record identifier for a data record based at least in part on the integrated identifier and the sequence value;

storing the data record in the first database; and associating the data record identifier with the data record, wherein the data record identifier uniquely identifies the data record across the plurality of databases.

18. The one or more computer-readable media of claim 17, wherein the integrated identifier is a first integrated identifier, the database name is a first database name, the database identifier is a first database identifier, the data record is a first data record, and the data record identifier is a first data record identifier, the operations further comprising:
- generating a second database based at least in part on the first database;
- determining a second integrated identifier for the second database based at least in part on a second database name of the second database and a second database identifier of the second database;
- determining a second data record identifier for a second data record based at least in part on the second integrated identifier;
- storing the second data record in the second database; and
- associating the second integrated identifier with the second data record.

19. The one or more computer-readable media of claim 17, wherein determining the integrated identifier comprises hashing the database name and the database identifier to generate a value that exceeds or is equal to a predetermined threshold.

20. The one or more computer-readable media of claim 17, wherein determining the database identifier comprises:
- determining at least one of a time stamp or a date stamp;
- determining a numeric value indicating a number of at least a portion of the plurality of databases generated within a predetermined time interval; and
- generating the database identifier by concatenating the at least one of the time stamp or the date stamp with the numeric value.

21. The one or more computer-readable media of claim 18, wherein the first database and the second database are organized in a horizontally partitioned manner.

\* \* \* \* \*